United States Patent
Abe

(10) Patent No.: US 8,612,790 B2
(45) Date of Patent: Dec. 17, 2013

(54) SERIAL DATA TRANSFER APPARATUS

(75) Inventor: Yoshiyuki Abe, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/601,179

(22) Filed: Aug. 31, 2012

(65) Prior Publication Data
US 2012/0331193 A1 Dec. 27, 2012

Related U.S. Application Data

(63) Continuation of application No. 13/331,696, filed on Dec. 20, 2011, now abandoned, which is a continuation of application No. 12/585,423, filed on Sep. 15, 2009, now Pat. No. 8,214,678.

(30) Foreign Application Priority Data

Oct. 3, 2008 (JP) .................................. 2008-258856
Feb. 16, 2009 (JP) .................................. 2009-032211

(51) Int. Cl.
G06F 1/00 (2006.01)

(52) U.S. Cl.
USPC ........... 713/324; 713/300; 713/320; 713/323; 710/31; 710/33; 710/106

(58) Field of Classification Search
None
See application file for complete search history.

(56) References Cited

U.S. PATENT DOCUMENTS

| | | | | |
|---|---|---|---|---|
| 5,506,993 | A * | 4/1996 | Fitch et al. ........................ | 710/33 |
| 5,524,000 | A | 6/1996 | Yoshimura et al. ............ | 370/419 |
| 6,201,830 | B1 | 3/2001 | Chellali et al. ................ | 375/222 |
| 6,414,961 | B1 * | 7/2002 | Katayanagi ............... | 370/395.71 |
| 6,850,539 | B1 | 2/2005 | Cassiers et al. ................ | 370/465 |
| 6,915,343 | B1 | 7/2005 | Brewer et al. ................. | 709/224 |
| 7,003,277 | B2 | 2/2006 | Toshida ...................... | 455/343.1 |
| 7,187,307 | B1 | 3/2007 | Schmidt et al. ................. | 341/50 |
| 7,249,271 | B2 | 7/2007 | Shibata et al. ................ | 713/324 |

(Continued)

FOREIGN PATENT DOCUMENTS

| | | | |
|---|---|---|---|
| JP | 6-243063 A | 9/1994 | |
| JP | 2005-260360 A | 9/2005 | ............. H04L 29/00 |
| JP | 2007-233993 A | 9/2007 | ............. G06F 13/00 |
| JP | 2007-259339 A | 10/2007 | |

OTHER PUBLICATIONS

'Data Encoding Techniques' by Rhys Haden, published Oct. 1, 2008 at rhyshaden.com.*
'PCI Express Basics' by Ravi Budruk, copyright 2007, PCI-SIG.*

(Continued)

Primary Examiner — Steven Snyder
(74) Attorney, Agent, or Firm — Foley & Lardner LLP

(57) ABSTRACT

A serial data transfer apparatus includes a transport controller that performs a process of a transport layer, a link controller that performs a process of a link layer, and a physical layer circuit that performs a process of a physical layer. The serial data transfer apparatus transmits and receives data with a destination apparatus via a serial bus. The link controller outputs idle data, which is received from the destination apparatus, to the physical layer circuit, and stops to operate of a unit responsible for generating data to transmit to the destination apparatus while outputting the idle data to the physical layer circuit. This enables to output idle data defined in the standard in an idle period of the serial data transfer apparatus and also reduce the power consumption.

9 Claims, 14 Drawing Sheets

(56) References Cited

U.S. PATENT DOCUMENTS

| | | | |
|---|---|---|---|
| 7,558,839 B1 | 7/2009 | McGovern | 709/218 |
| 7,673,075 B1 | 3/2010 | Masiewicz | 710/2 |
| 7,739,419 B2 | 6/2010 | Matsuda | 710/5 |
| 7,843,823 B2 | 11/2010 | Lev-Ran et al. | 370/230.1 |
| 2003/0165142 A1 | 9/2003 | Mills et al. | 370/395.62 |
| 2005/0138261 A1 | 6/2005 | Marushak et al. | 710/316 |
| 2005/0182874 A1 | 8/2005 | Herz et al. | 710/74 |
| 2005/0201305 A1 | 9/2005 | Shibata et al. | 370/282 |
| 2005/0201411 A1* | 9/2005 | Shibata et al. | 370/463 |
| 2006/0168391 A1* | 7/2006 | Gan et al. | 711/103 |
| 2006/0275041 A1 | 12/2006 | Kitaji et al. | 398/182 |
| 2007/0022337 A1 | 1/2007 | Fagerness et al. | 714/724 |
| 2008/0025335 A1 | 1/2008 | Lu | 370/419 |
| 2008/0215789 A1 | 9/2008 | Matsuda et al. | 710/308 |
| 2008/0235417 A1 | 9/2008 | Weng et al. | 710/106 |
| 2010/0049896 A1 | 2/2010 | Ahmed et al. | 710/308 |
| 2010/0125685 A1 | 5/2010 | Ohta | 710/31 |
| 2013/0166783 A1* | 6/2013 | Kim et al. | 710/6 |

OTHER PUBLICATIONS

'Information Technology—Serial Attached SCSI-1.1 (SAS 1.1)' Working Draft Revision 4, Mar. 13, 2004, T10 Technical Committee.*

Information Technology—Serial Attached SCSI-1.1 (SAS 1.1), Working Draft Revision 4, Mar. 13, 2004, T10 Technical Committee.

USPTO, Office Action U.S. Appl. No. 13/331,696, Jan. 11, 2012.

USPTO Office Action, U.S. Appl. No. 13/331,696, Jun. 7, 2012.

USPTO Notice of Allowance, U.S. Appl. No. 12/585,423, Jan. 6, 2012.

Office Action issued in Japanese patent application No. 2009-032211 and English translation, Oct. 30, 2012, 5 pages.

* cited by examiner

SERIAL DATA TRANSFER APPARATUS

CROSS-REFERENCE TO RELATED PATENT APPLICATIONS

This application is a continuation of application Ser. No. 13/331,696 filed Dec. 20, 2011, now pending, which claims the benefit of priority from application Ser. No. 12/585,423. filed Sep. 15, 2009, which claims the benefit of priority from the prior Japanese Patent Application No. 2008-258856, tiled Oct. 3, 2008, and Japanese Patent Application No. 2009-032211, filed Feb. 16, 2009, the entire contents of which are incorporated herein by reference. This application claims only subject matter disclosed in the parent application and therefore presents no new matter.

BACKGROUND

1. Field of the Invention

The present invention relates to a technique to reduce the power consumption of a serial data transfer apparatus which transmits/receives to/from a destination apparatus via a serial bus.

2. Description of Related Art

High-speed serial transfer interfaces, such as serial ATA (SATA), SAS (Serial Attached SCSI), PCI Express, and USB3.0, are used for various communication devices.

FIG. 14 is FIG. 1 of Japanese Unexamined Patent Application Publication No. 2007-233993, illustrating the layer structure of the SATA transfer interface disclosed in Japanese Unexamined Patent Application Publication No. 2007-233993.

It is defined that the layer structure of SATA is divided into a physical layer, a link layer, a transport layer, and an application layer based on the OSI reference model. The processes of the physical layer, the link layer, and the transport layer are realized by a physical layer circuit (PHY controller), a link controller, and a transport controller which are provided to a host and a device side. The process of the application layer is realized by software, a buffer memory, and a DMA (Direct Memory Access) engine etc., which are provided to both the host and the device side.

As shown in FIG. 14, the SATA transfer interface includes a physical layer circuit 100, a link controller 50, and a transport controller 10.

The transport controller 10 performs the process of the transport layer. In response to a transmission request of FIS (Frame Information Structure), which is to be transmission data, from an upper layer (the application layer), the transport controller 10 transmits data to the link layer. When the transport controller 50 receives FIS, which is reception data, from the link controller 50, the transport controller 10 notifies the reception result to the upper layer.

The physical layer circuit 100 performs the process of the physical layer, which is to carry out a parallel-to-serial conversion to the data received from the link controller 50 by a transmitter 110 and output it to a SATA bus. When receiving data by a receiver 120 via a SATA bus, the physical layer circuit 100 performs a serial-to-parallel conversion to the received data and outputs it to the link controller 50.

The link controller 50 performs the process of the link layer. In order to transmit the transmission data FIS from the transport controller 10, the link controller 50 adds a CRC generation result, performs a scrambling process, an 8b/10b encoding, and adds primitives such as SOF (Start of Frame) and EOF (End of Frame), to output the data to the physical layer circuit 100.

In SATA, a CONT primitive is prepared to avoid EMI (Electro Magnetic Interference) caused by same and consecutive control codes. When a receiving side receives the CONT primitive, reception data following the CONT primitive is ignored until another effective primitive is received. Therefore, in an idle period when FIS is not transferred, a sending side uses the CONT primitive to transmit scramble data, so as to reduce EMI.

Thus the link controller 50 also has a function to generate scramble data for the idle period, and continues to transmit the scramble data following the CONT primitive in the idle period until another effective primitive is transmitted.

For the data received from the physical layer circuit 100, the link controller 50 analyzes the primitives, performs an 8b/10h decoding, a descrambling process, and a CRC check, so as to obtain FIS, which is reception data, and a CRC check result, and outputs them to the transport controller 10, As shown in FIG. 14, the link controller 50 is divided into a Tx block, which is responsible for transmission, and an Rx block, which is responsible for reception.

The Tx block includes a pattern generator 52, a scrambler 54, a selector 61, a CRC calculation unit 58, a selector 62, a data scrambler 56, a selector 63, and an 8b/10b encoder 60. The Tx block is responsible for the abovementioned transmission process by the link controller 50. Among these functional blocks, the data scrambler 56 performs scrambling process to FIS and CRC when transmitting the FIS. The scrambler 54 generates scramble data following the CONT primitive in the idle period. The SATA standard defines to generate the scramble data by a linear feedback shift register (LFSR) using a generator polynomial.

The Rx block of the link controller 50 includes an 8b/10b decoder 74, a data descrambler 70, and a CRC calculation unit 72. The Rx block is responsible for the abovementioned reception process by the link controller 50. When receiving a CONT primitive, the Rx block discards the scramble data following the CONT primitive until another effective primitive is received.

Not limited to SATA, but many of the abovementioned high-speed serial interfaces are defined to continue transmitting idle data like the scramble data following the CONT primitive in the idle period. In such serial transfer interfaces, the functional blocks (such as the scrambler 54 and the 8b/10b encoder 60 in FIG. 14) for generating idle data must keep operating during the idle period as well.

Therefore, such high-speed serial transfer interfaces consumes power even in the idle period. For the serial transfer interfaces such as PCI Express which is targeted for personal computers, power saving is not strongly requested. Therefore, it is not an issue even if idle data is output during the idle period. However, for mobile information devices such as mobile phones, the amount of power consumption is a major issue that concerns the existence of the product and various attempts have been made to save power in the idle period.

Japanese Unexamined Patent Application Publication No. 2005-260360 discloses a data transfer apparatus that achieves to save power in the idle period. In this data transfer apparatus, in the idle period, an encoder circuit stops operation, and a transmitter in a physical layer circuit continues to output idle signals with its logical level fixed to a first logical level to a serial bus for a predetermined number of bits or more, as signals to indicate the idle state.

The data transfer apparatus prevents the encoder circuit from consuming power in the idle period and thus attempts to save power.

SUMMARY

Incidentally, the method disclosed in the Japanese Unexamined Patent Application Publication No. 2005-260360 outputs signals other than idle data which are defined in the standard, thus the destination apparatus must have a similar configuration. Therefore, the present inventor has found a problem that there is a possibility that an error is generated and communications fail even if the destination apparatus conforms to the standard.

An exemplary aspect of an embodiment of the present invention is a serial data transfer apparatus. The serial data transfer apparatus includes a transport controller that performs a process of a transport layer, a link controller that performs a process of a link layer, and a physical layer circuit that performs a process of a physical layer. The serial data transfer apparatus transmits and receives data with a destination apparatus via a serial bus.

The link controller outputs idle data received from the destination apparatus to the physical layer circuit and also stops the operation of the unit responsible for generating data to transmit to the destination apparatus while outputting the idle data.

The above serial data transfer apparatus may he replaced with a system or a method and such system or method is effective as an aspect of the present invention.

The present invention enables to output idle data conformed to the standard in an idle period of a serial data transfer apparatus and also reduce the power consumption.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

[First Exemplary Embodiment]

Figure 1:
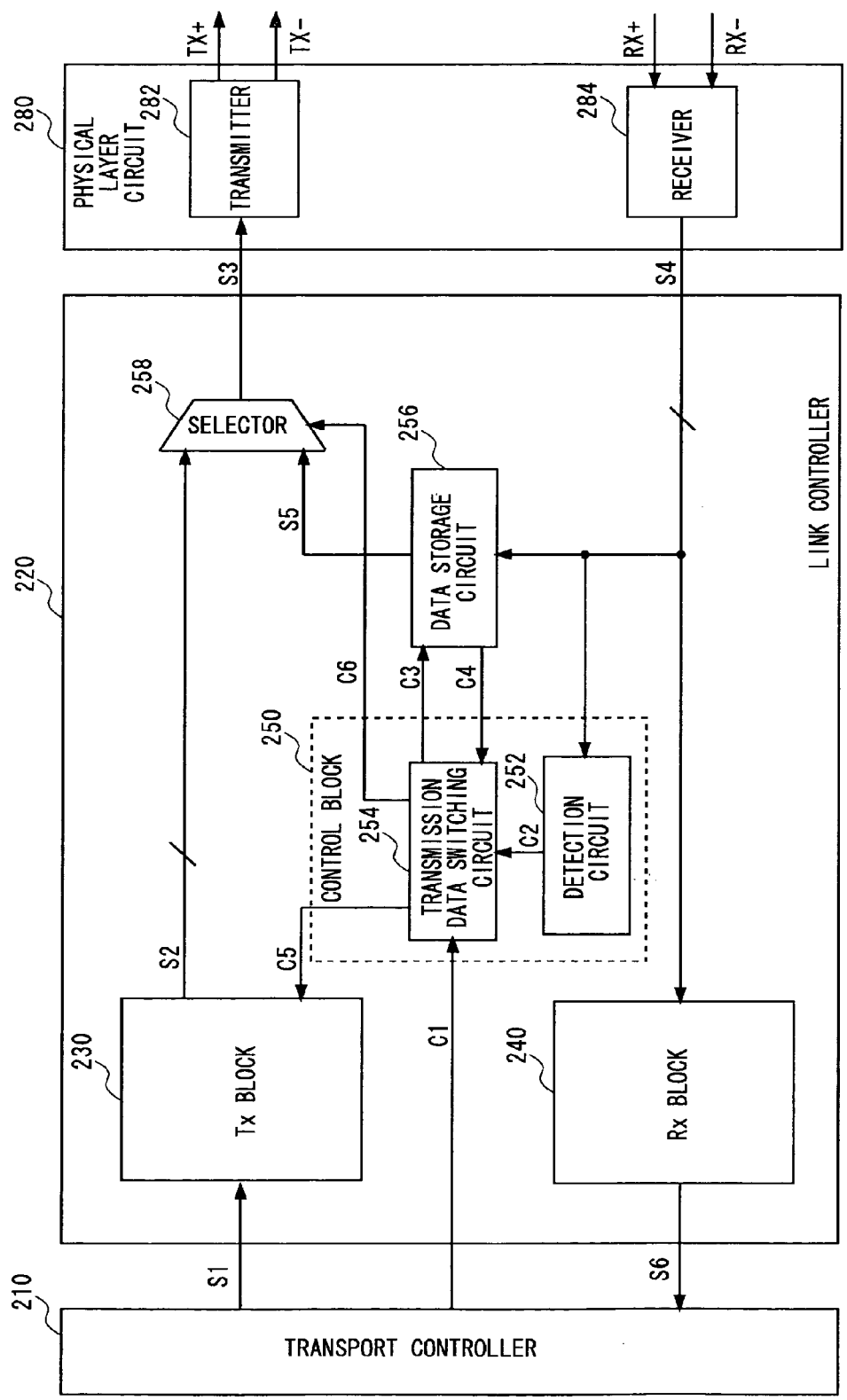
FIG. 1 illustrates a serial data transfer apparatus according to a first exemplary embodiment of the present invention.

FIG. 1 illustrates a serial data transfer apparatus 200 according to a first exemplary embodiment of the present invention. The serial data transfer apparatus 200 includes a transport controller 210, a link controller 220, and a physical layer circuit 280. These functional blocks respectively perform the processes of a transport layer, a link layer, and a physical layer (PHY) to data transmitted to a serial bus, and data received from a serial bus not illustrated. In the following explanation, the state in which the serial data transfer apparatus 200 is transferring data with a destination apparatus is referred to as a data transfer state, while the state not in data transfer is referred to as an idle state. The serial data transfer apparatus 200 can be applied to any serial transfer interface that outputs idle data in an idle period. However for ease of explanation, the serial data transfer apparatus 200 is used as an interface conformed to the SATA standard.

The transport controller 210 has the same function as the transport controller of a normal serial data transfer apparatus. In response to a transmission request for data from an upper layer (the application layer), the transport controller 210 outputs the content of the transmission data (hereinafter referred to as a transmission payload S1) to the link controller 220. Further, at a reception of a reception payload S6 from the link controller 50, the transport controller 210 notifies the reception result to the upper layer. The transport controller 210 transmits a transmission start signal C1 to the link controller 220 to request for a data transfer. This transmission start signal C1 is active while the transport controller 210 is transmitting data to the link controller 220, and inactive from the point when the data transmission is completed to the start of the next data transmission.

The physical layer circuit 280 also has the similar function as the physical layer circuit of a normal serial data transfer apparatus, and is provided with a transmitter 282 and a receiver 284. The transmitter 282 performs a parallel-to-serial conversion to an output S3 from the link controller 220, and outputs it to a serial bus. The receiver 284 performs a serial-to-parallel conversion to data received from a serial bus to obtain reception data S4, which is output to the link controller 220.

The link controller 220 performs the process to generate transmission data from the transmission payload S1 received from the transport controller 210 to output the data to the physical layer circuit 280, and the process to generate idle data to output to the physical layer circuit 280 in the idle period. When the link controller 220 receives the reception data S4, which is not idle data, from the physical layer circuit 280, the link controller 220 obtains the payload (abovementioned reception payload S6) from the reception data and outputs it to the transport controller 210. The operation when the reception data S4 is idle data, which is received from the physical layer circuit 280, is described together with the detailed explanation of the functional blocks of the link controller 220.

The link controller 220 includes a Tx block 230, an Rx block 240, a control block 250, a data storage circuit 256, and a selector 258. The control block 250 includes a detection circuit 252 and a transmission data switching circuit 254.

The Tx block 230 is controlled by a stop signal C5, which is described later, from the transmission data switching circuit 254. Specifically, when the stop signal C5 is inactive, in a similar way as the transmission process block of the link controller of a not vial serial data transfer apparatus (such as the transmission process block of the link controller 50 in the data transfer apparatus of FIG. 14), the Tx block 230 generates transmission data S2 from the transmission payload S1 to be output to the physical layer circuit 280 in the data transfer state. In the idle period, the Tx block 230 generates idle data (CONT primitive and scramble data following the CONT primitive) as the transmission data S2 to output. The generation processes of the transmission data S2 are, for example, an addition of a CRC generation result, a scrambling process, an 8b/10b encoding, and an addition of primitives.

When the stop signal C5 from the transmission data switching circuit 254 is active, the Tx block 230 stops the operation.

Further, in this exemplary embodiment, the Tx block 230 is connected to the selector 258, and the output S2 from the Tx block 230 is input to the selector 258.

Figure 14:
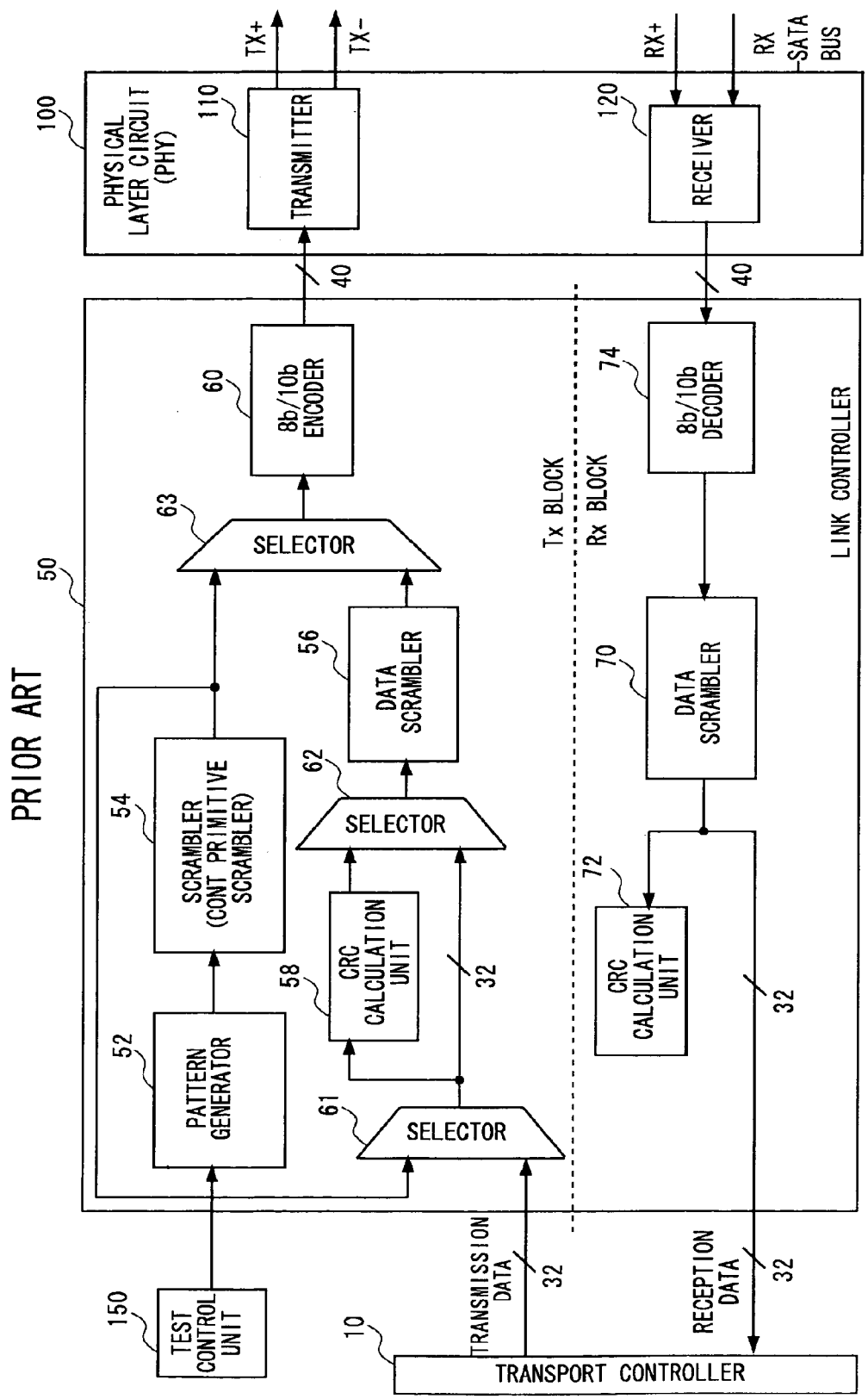
FIG. 14 illustrates the layer structure of an SATA transfer interface disclosed in Japanese Unexamined Patent Application Publication No. 2007-233993.

The Rx block 240 has the same function as the reception process block of a normal serial data transfer apparatus (for example, the Rx block of the data transfer apparatus of FIG. 14). Specifically, if the reception data S4 from the receiver 284 is not idle data, the Rx block 240 obtains the reception payload S6 from the reception data S4 and outputs it to the transport controller 210. If the reception data S4 is idle data, the Rx block 240 discards the reception data S4.

The detection circuit 252 inputs the reception data S4 from the receiver 284 and detects whether the reception data S4 is idle data or not. The serial data transfer apparatus 200 of this exemplary embodiment conforms to the SATA standard. Thus the detection circuit 252 detects a CONT primitive in the reception data S4 and outputs a primitive detection signal C2 to the transmission data switching circuit 254 according to the detection result. This primitive detection signal C2 is activated when detecting a CONT primitive and deactivated when an effective primitive is detected.

The transmission data switching circuit 254 controls the Tx block 230 by the stop signal C5, the data storage circuit 256 by a storage instruction signal C3, and the selector 258 by a switching signal C6.

When the stop signal C5 is inactive, the Tx block 230 operates. When the stop signal C5 is active, the Tx block 230 stops operation.

When the storage instruction signal C3 is inactive, the data storage circuit 256 stops storage operation. When the storage instruction signal C3 is active, the data storage circuit 256 stores the reception data S4 from the receiver 284. When completing to store the reception data S4, the stored data (S5 in FIG. 1) is output to the selector 258. At the same time, the data storage circuit activates a storage completion signal C4 to output to the transmission data switching circuit 254, indicating whether the reception data S4 is stored or not.

If the switching signal C6 is inactive, the selector 258 selects the output S2 from the Tx block 230 and outputs it to the transmitter 282. If the switching signal C6 is active, the selector 258 selects the output S5 from the data storage circuit 256 and outputs it to the transmitter 282.

Figure 2:
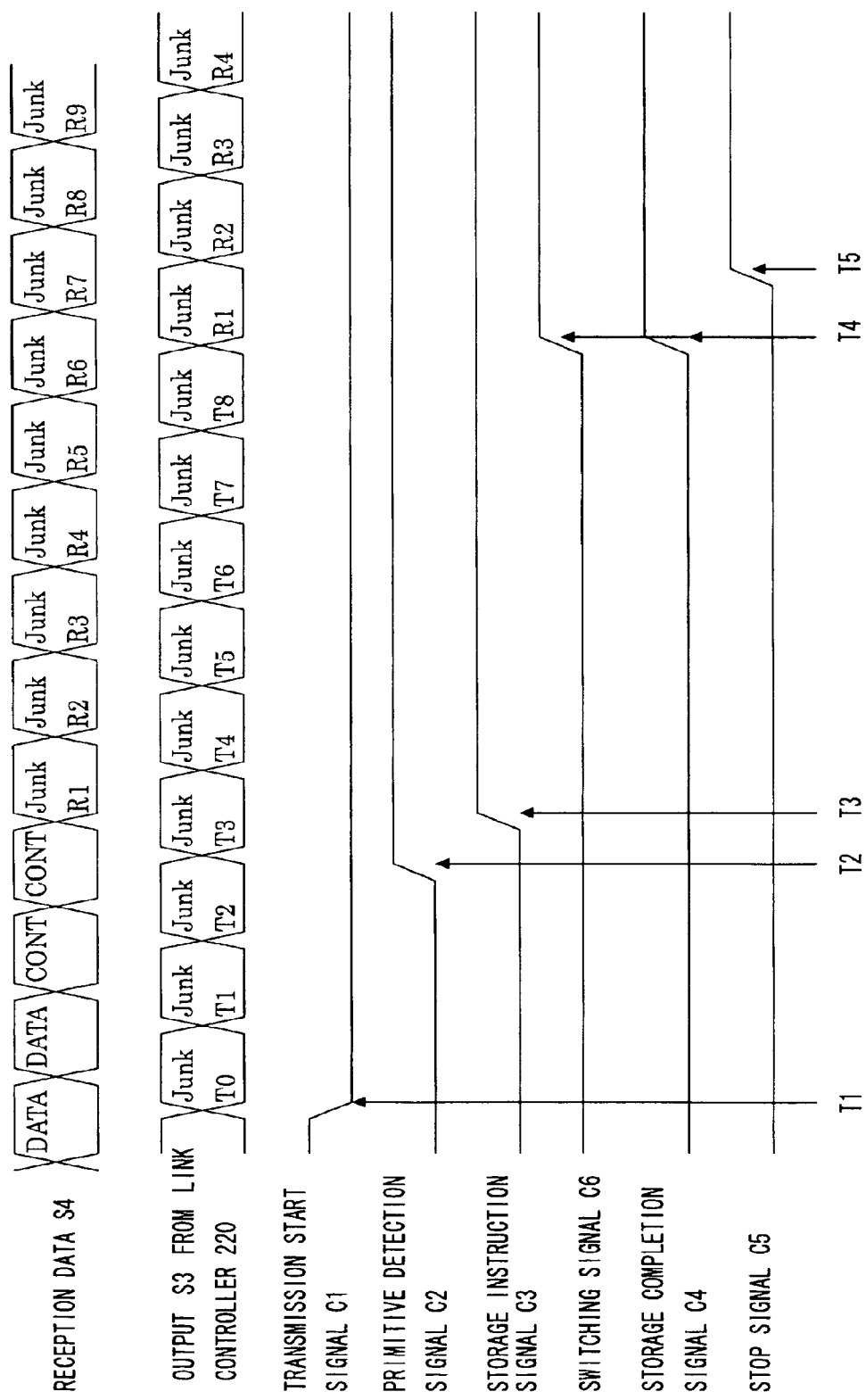
FIG. 2 is a timing chart illustrating the process of the serial data transfer apparatus of FIG. 1 (1)
Figure 3:
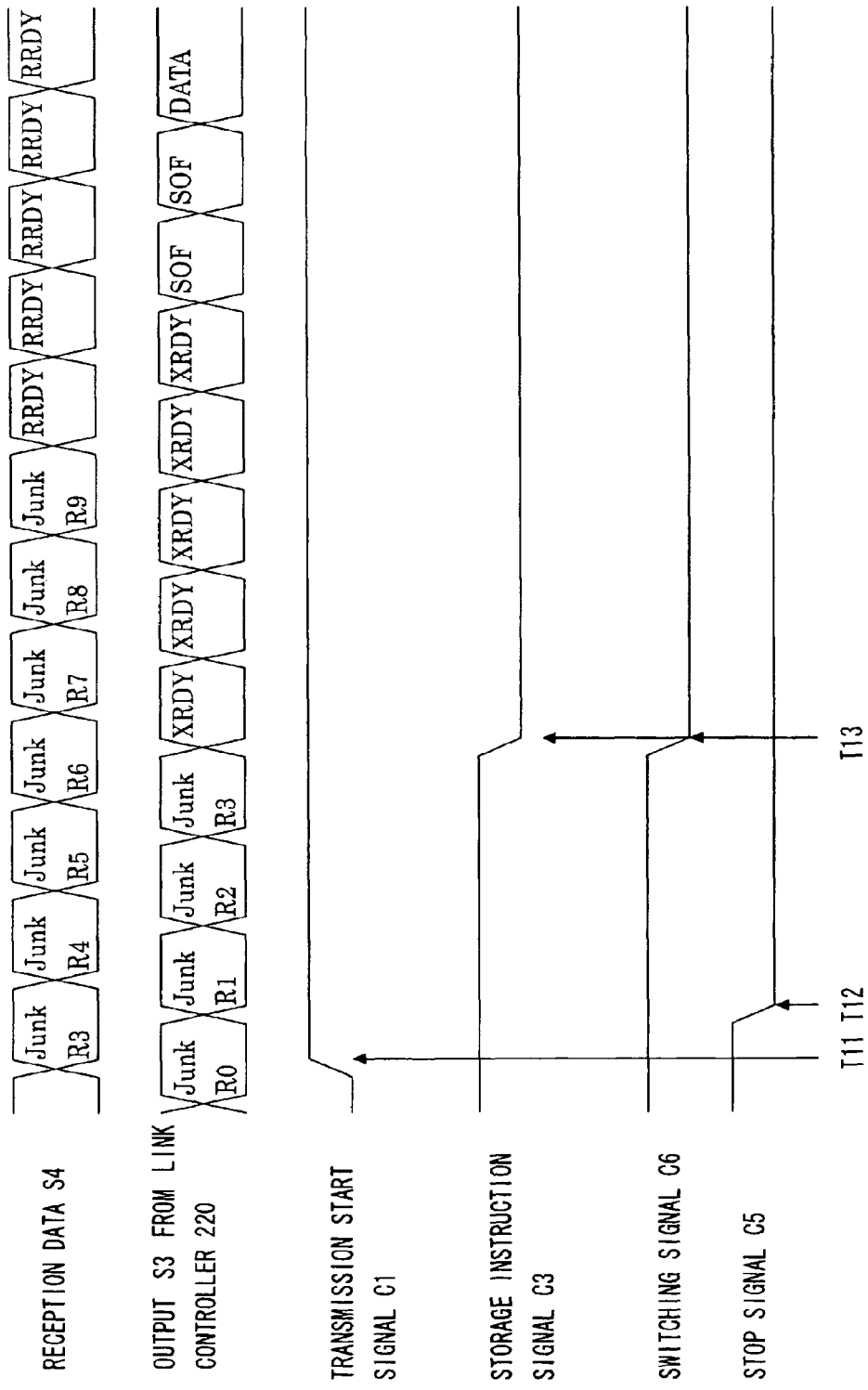
FIG. 3 is a timing chart illustrating the process of the serial data transfer apparatus of FIG. 1 (2)
Figure 4:
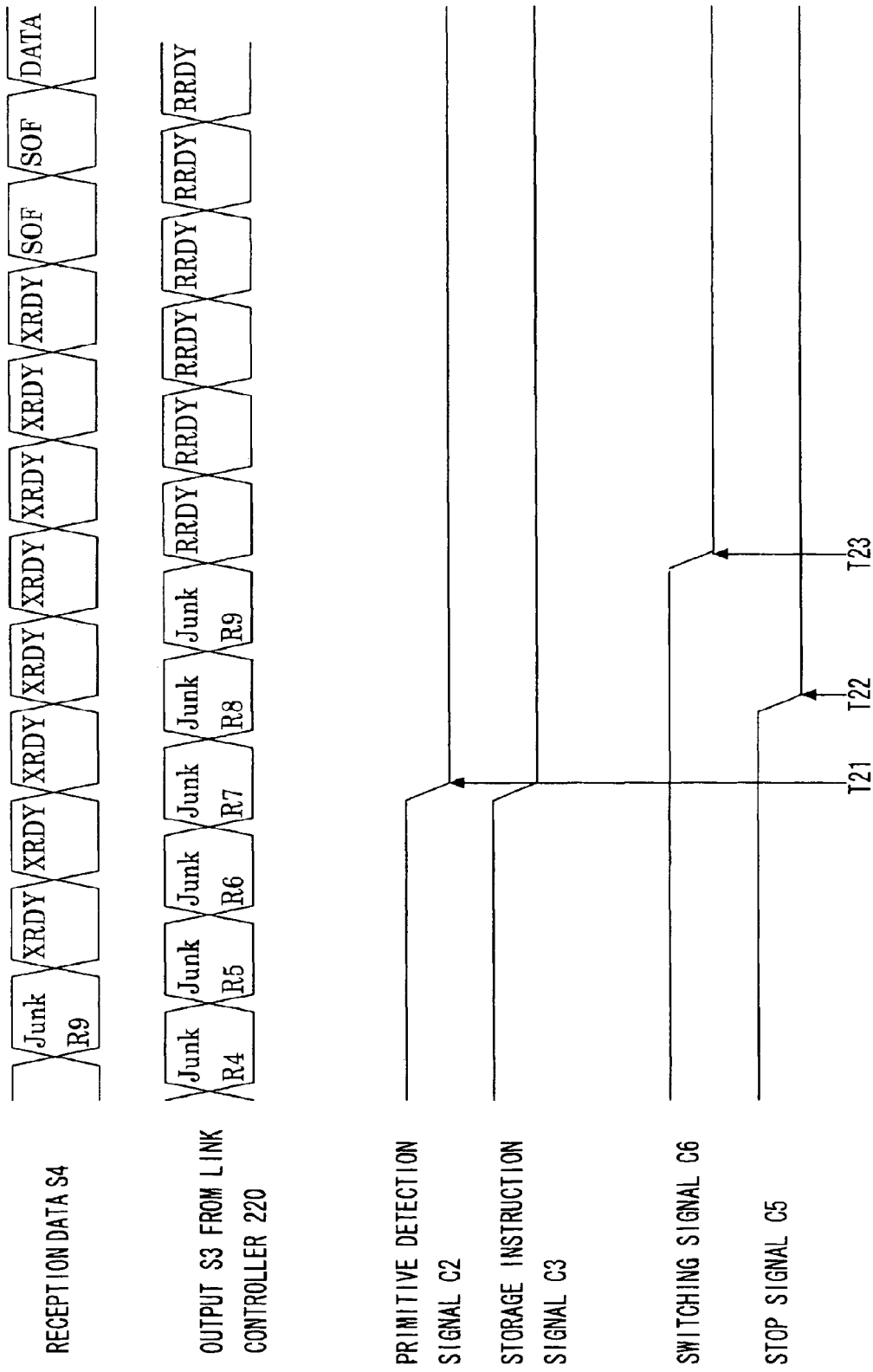
FIG. 4 is a timing chart illustrating the process of the serial data transfer apparatus of FIG. 1 (3)

With reference to FIGS. 2 to 4, detailed explanations are given hereinafter for the control operation of the control block 250 and the processes performed by the Tx block 230, the data storage circuit 256, and the selector 258 according to the control of the transmission data switching circuit 254.

FIG. 2 is a timing chart in case the serial data transfer apparatus 200 shifts from the data transfer state to the idle state.

The serial data transfer apparatus 200 is transferring data till the timing T1, at which the transmission start signal C1 is active, and the primitive detection signal C2 and the storage completion signal C4 are inactive.

In this case, the storage instruction signal C3 output from the transmission data switching circuit 254 to the data storage circuit 256, the stop signal C5 output to the Tx block 230, and the switching signal C6 output to the selector 258 are all inactive.

Therefore, the Tx block 230 operates, generates the transmission data S2 corresponding to the transmission payload S1, and outputs it to the selector 258.

Further, the selector 258 selects the output S2 from the Tx block 230, and outputs it to the transmitter 282 of the physical layer circuit 280. Accordingly, in this case, the output S3 from the link controller 220 to the serial bus is the transmission data generated from the transmission payload S1 by the Tx block 230.

Note that the data storage circuit 256 does not store the reception data S4 and output it to the selector 258.

At the timing T1, by the completion of the data transfer, the transmission start signal C1 is deactivated, which is output from the transport controller 210 to the transmission data switching circuit 254. Further, idle data (Junk in the drawings) is transmitted/received between the serial data transfer apparatus 200 and the communication destination. As shown in FIG. 2, from the timing T1 to the timing T2, at which the detection circuit 252 detects a CONT primitive from the reception data S4, the primitive detection signal C2 is inactive, and the stop signal C5, the storage instruction signal C3, and the switching signal C6 from the switching circuit 254 are inactive.

Therefore, the Tx block 230 operates, generates scramble data and encodes so as to generate idle data, and outputs it to the selector 258.

The selector 258 selects the output S2 from the Tx block 230, and outputs it to the transmitter 282 of the physical layer circuit 280. Accordingly, in this period, the output S3 from the link controller 220 to the physical layer 280 is idle data generated by the Tx block 230.

The data storage circuit 256 does not yet store the reception data S4 and output it to the selector 258.

At the timing T2, the detection circuit 252 detects a CONT primitive from the reception data S4. Thus the primitive detection signal C2 is activated. Therefore, at the timing T3 immediately after the timing T2, the transmission data switching circuit 254 activates the storage instruction signal C3, which is output to the data storage circuit 256.

Then the data storage circuit 256 starts storing the reception data S4. The stop signal C5 and the switching signal C6 remain to be inactive till the timing T4, at which the data storage circuit 256 finishes storing the reception data S4.

Therefore, the Tx block 230 continues to operate, generate scramble data, and encode so as to generate idle data, and output it to the selector 258.

The selector 258 selects the output S2 from the Tx block 230, and outputs it to the transmitter 282 of the physical layer circuit 280. Accordingly, in this period as well, the output S3 from the link controller 220 to the physical layer 280 is idle data generated by the Tx block 230.

At the timing T4, the data storage circuit 256 finished storing the reception data S4, thus the data storage circuit 256 activates the storage completion signal C4 to be transmitted to the transmission data switching circuit 254 and also outputs the stored data to the selector 258.

The transmission data switching circuit 254 activates the switching signal C6 at the same time the storage completion signal C4 is activated. Then, the selector 258 selects the output S5 from the data storage circuit 256, and outputs it to the transmitter 282 in the physical layer circuit 280. Thus, in this case, the output S3 from the link controller 220 to the physical layer circuit 280 is idle data stored by the data storage circuit 256 and received from the destination apparatus.

The transmission data switching circuit 254 activates the stop signal C5 at the timing T5, which is immediately after the timing T4. Then the Tx block 230 stops the operation.

FIG. 3 is a timing chart in case the serial data transfer apparatus 200 returns to the data transfer state from the idle state in response to a data transfer request from the transport controller 210.

At the timing T11, the transport controller 210 notifies to the transmission data switching circuit 254 that the data transmission has started. Thus the transport controller 210 activates the transmission start signal C1 to request for a data transfer.

When the transmission start signal C1 is activated, the transmission data switching circuit 254 deactivates the stop signal C5 at the timing T12, which is immediately after the timing T11.

Therefore, the Tx block 230 starts the operation. The transmission data switching circuit 254 keeps the storage instruction signal C3 and the switching signal C4 active till the timing T13, at which the transmission data of the Tx block 230 is prepared. Therefore, till the timing T13, the output S3 from the link controller 220 to the physical layer circuit 280 is still idle data which is stored in the data storage circuit 256 and received from the destination apparatus.

The transmission data switching circuit 254 deactivates the storage instruction signal C3 and the switching signal C6 at the timing T13. Then the data storage circuit 256 stops to store the reception data S4 and outputting to the selector 258. Further, the link controller 220 outputs the transmission data generated by the Tx block 230.

FIG. 4 is a timing chart in case the serial data transfer apparatus 200 shifts from the idle state to the data transfer state in response to a data transfer request received from the destination apparatus.

The detection circuit 252 detects a transfer request (XRDY primitive) from the reception data S4 at the timing T21 and deactivates the primitive detection signal C2.

When the primitive detection signal C2 is deactivated, the transmission data switching circuit 254 deactivates the storage instruction signal C3 and also deactivates the stop signal C5 at the timing T22, which is immediately after the timing T21.

Therefore, the data storage circuit 256 stops to store the reception data S4, and the Tx block 230 starts the operation. The transmission data switching circuit 254 keeps the switching signal C6 active till the timing T23, at which the Tx block 230 outputs a RRDY primitive to the destination apparatus, indicating "ready to receive", Therefore, till the timing T23, the output S3 from the link controller 220 to the physical layer circuit 280 is still idle data, which is stored to the data storage circuit 256 and received from the destination apparatus.

The transmission data switching circuit 254 deactivates the switching signal C6 at the timing T23. Then the link controller 220 outputs the RRDY primitive, which is output from the Tx block 230 to the selector 258, and the serial data transfer apparatus 200 enters the data transfer state.

As stated above, in the serial data transfer apparatus 200 of this exemplary embodiment, the data storage circuit 256 stores the idle data received from the communication destination in the idle period, and the selector 258 outputs the idle data stored in the data storage circuit 256 to the physical layer circuit 280. Therefore, idle data defined by the standard can be transmitted to the serial bus during the idle period. Further, the power consumption of the serial data transfer apparatus 200 can be reduced by stopping the operation of the Tx block 230 which includes the data scrambler and the encoder etc.

[Second Exemplary Embodiment]

A second exemplary embodiment of the present invention is also a serial data transfer apparatus. A serial data transfer apparatus of this exemplary embodiment includes a transmission data switching circuit 254A and a data supply circuit 256A, instead of the transmission data switching circuit 254 and the data storage circuit 256 in the serial data transfer apparatus 200. Only the transmission data switching circuit 254A and the data supply circuit 256A in the serial data transfer apparatus according to the second exemplary embodiment are described in detail.

Figure 5:
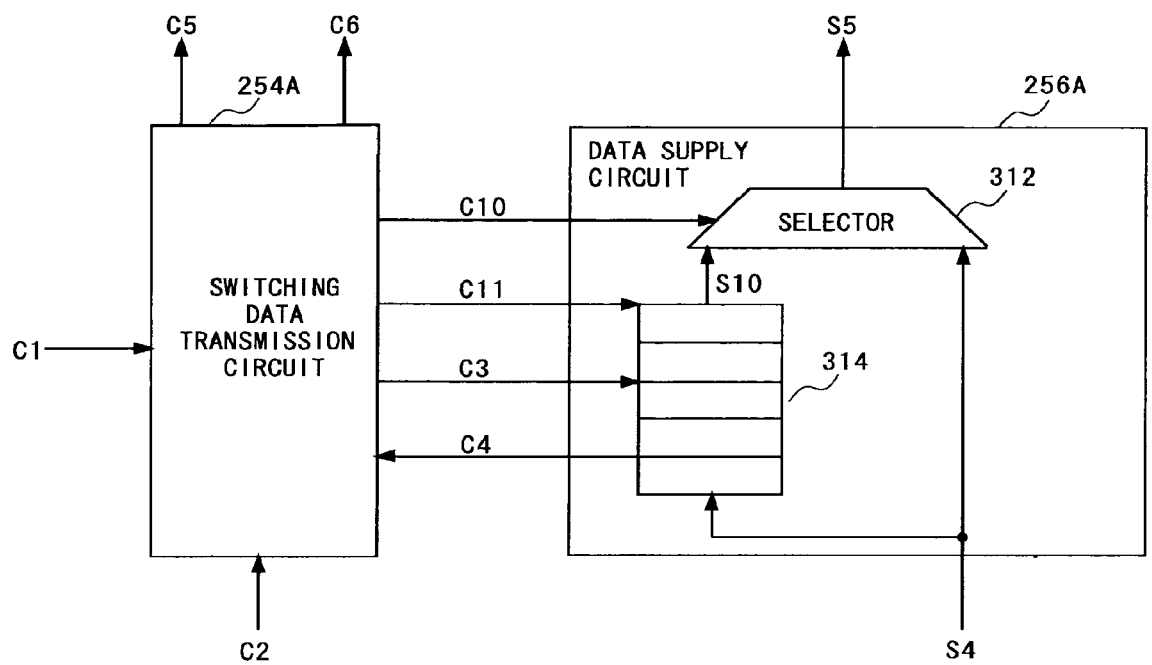
FIG. 5 illustrates a transmission data switching circuit and a data storage circuit according to a second exemplary embodiment of the present invention.

FIG. 5 illustrates the transmission data switching circuit 254A and the data supply circuit 256A in the serial data transfer apparatus of the second exemplary embodiment of the present invention. In FIG. 5, among the data and signals input/output by the transmission data switching circuit 254A and the data storage circuit 256A, similar data and signals as the ones input/output by the transmission data switching circuit 254 and the data storage circuit 256 in the serial data transfer apparatus 200 are denoted by the same signs in FIG. 1.

The data supply circuit 256A includes a selector 312 and a buffer 314. The buffer 314 functions as a data storage circuit, and temporarily stores the reception data S4 from the physical layer circuit 280. The selector 312 selects either the reception data S4 or data S10 stored in the buffer 314 (hereinafter referred to as buffer data), and outputs the selected data to the selector 258. Note that the selector 312 includes a buffer (not illustrated for aligning the phases of the reception data S4 and the output S3 from the link controller 220 to the physical layer circuit 280.

The operation of the selector 312 is controlled by a select signal C10 from the transmission data switching circuit 254A. The operation of the buffer 314 is controlled by the storage instruction signal C3 and a buffer stop signal C11 from the transmission data switching circuit 254A. Accordingly, in this exemplary embodiment, the transmission data switching circuit 254A outputs the buffer stop signal C11 to the buffer 314, indicating whether to stops to buffer or not, in addition to the storage instruction signal C3 for storing the reception data S4 to the buffer 314. Further, the transmission data switching circuit 254A also outputs the select signal C10, which specifies to select output data, to the selector 312 of the data supply circuit 256A.

Figure 6:
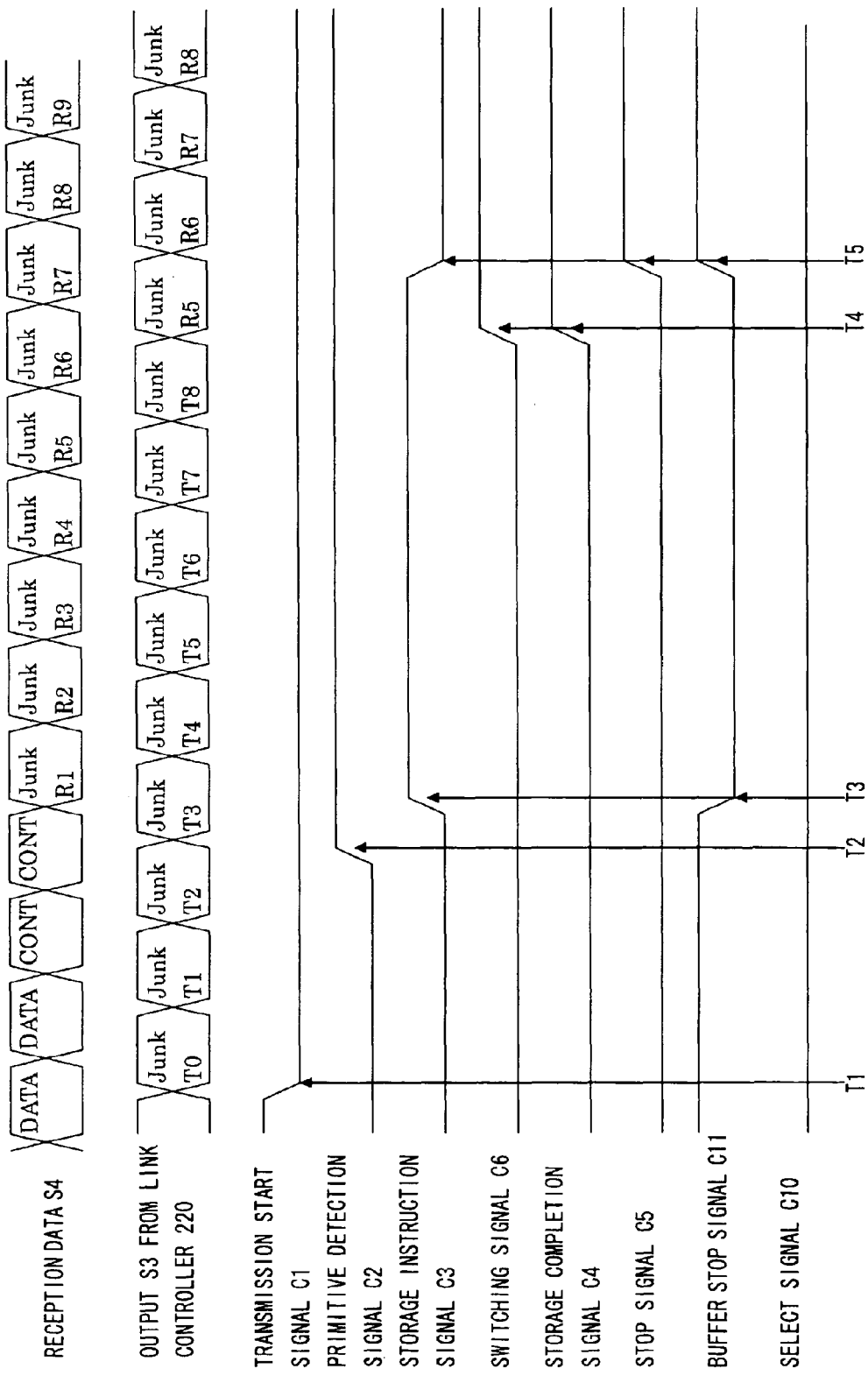
FIG. 6 is a timing chart illustrating the process of the serial data transfer apparatus according to the second exemplary embodiment of the present invention (1)
Figure 7:
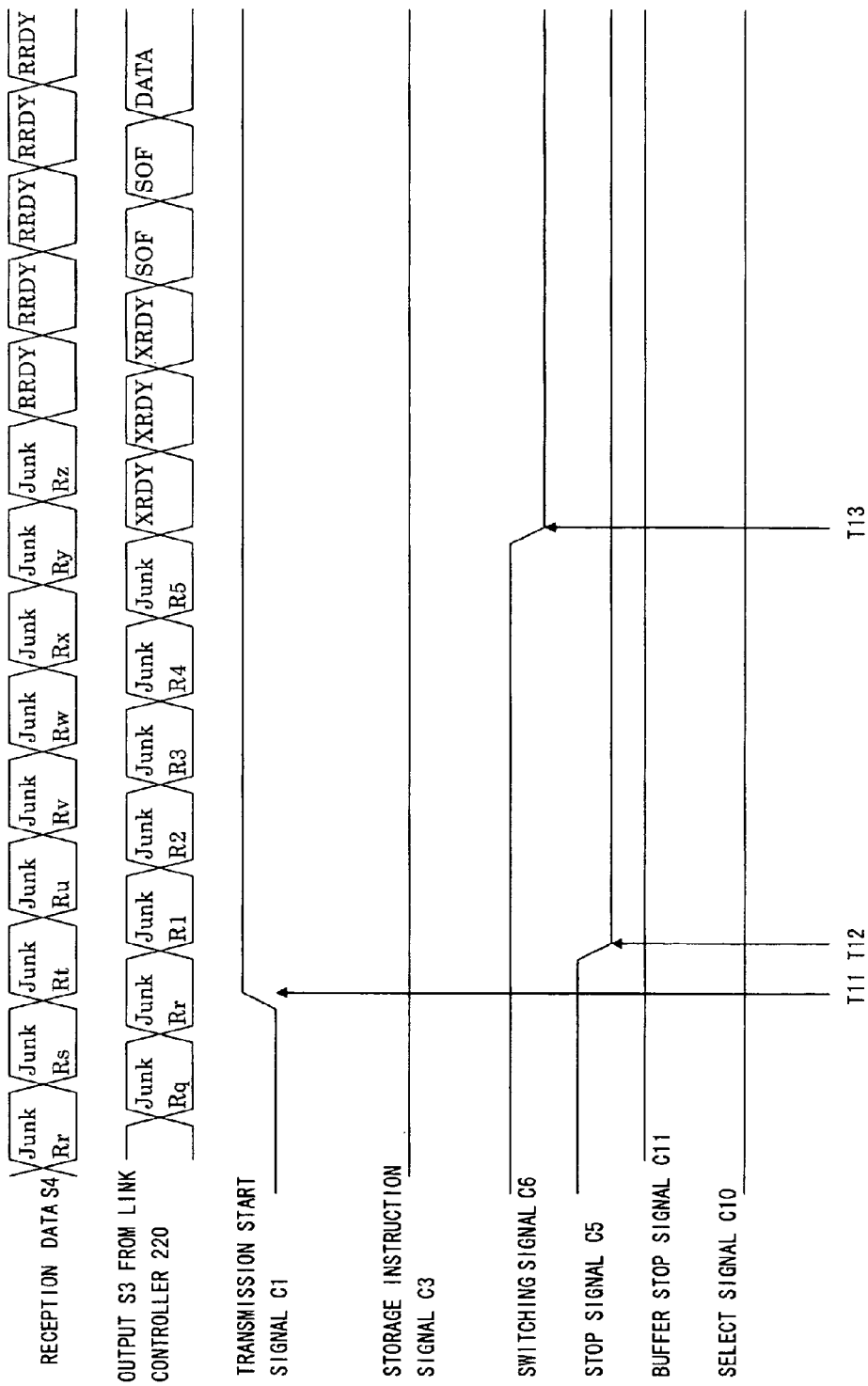
FIG. 7 is a timing chart illustrating the process of the serial data transfer apparatus according to the second exemplary embodiment of the present invention (2)
Figure 8:
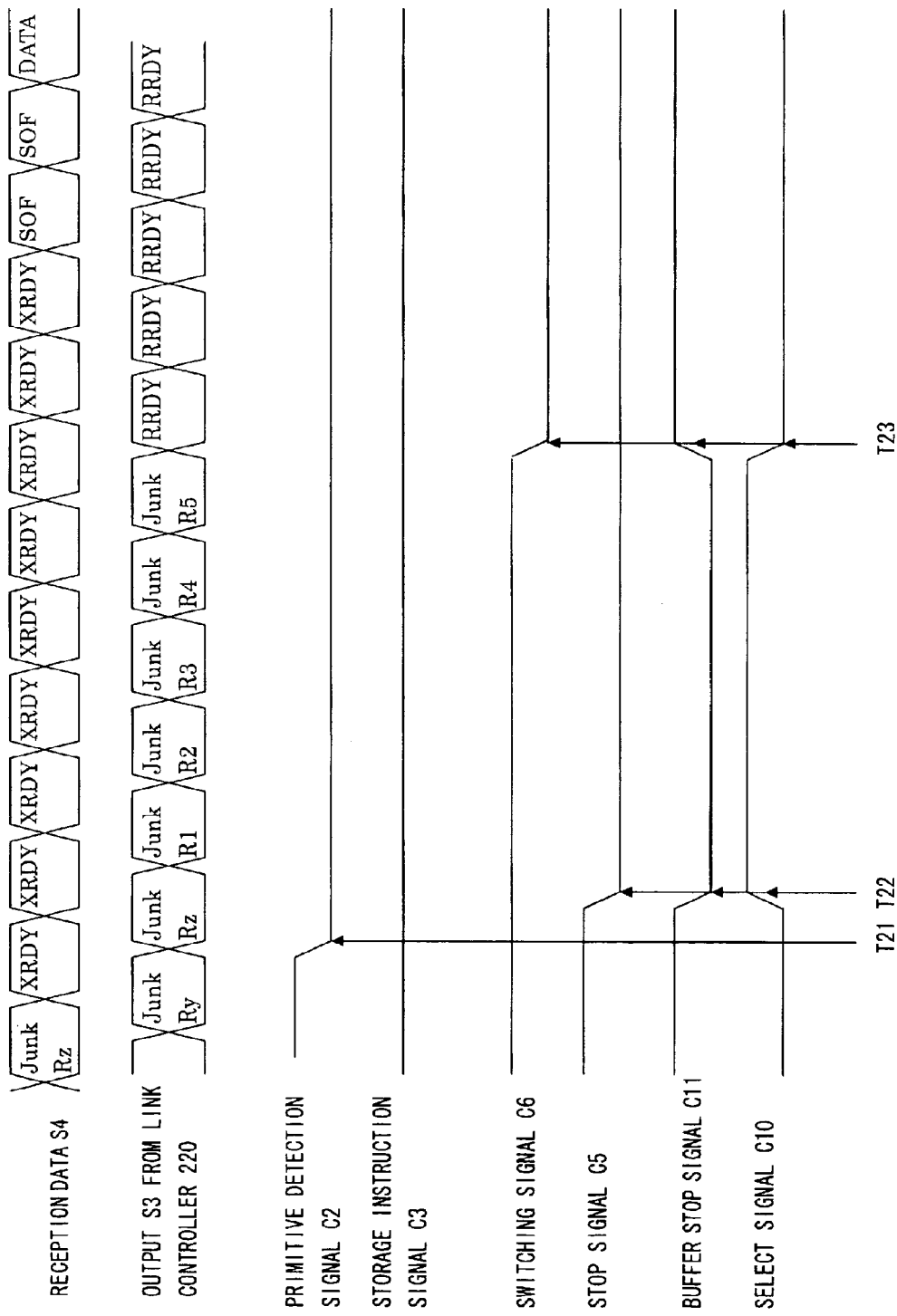
FIG. 8 is a timing chart illustrating the process of the serial data transfer apparatus according to the second exemplary embodiment of the present invention (3)

With reference to FIGS. 6 to 8, detailed explanations are given hereinafter for the control operation of the transmission data switching circuit 254A and the processes performed by the Tx block 230, the data storage circuit 256A, and the selector 258 according to the control operation of the transmission data switching circuit 254A.

FIG. 6 is a timing chart in the case of shifting to the idle state from the data transfer state.

Till the timing T1, the serial data transfer apparatus is transferring data, the transmission start signal C1 is active, and the primitive detection signal C2 output from the detection circuit 252 to the transmission data switching circuit 254A is inactive. Further, the storage completion signal C4 output from the buffer 314 to the transmission data switching circuit 254A is also inactive.

In this case, the switching signal C6 output from the transmission data switching circuit 254A to the selector 258, the stop signal C5 output to the Tx block 230, the select signal C10 output to the selector 312, and the storage instruction signal C3 output to the buffer 314 are all inactive. Only the buffer stop signal C11 output to the buffer 314 is active.

Therefore, the Tx block 230 operates, generates the transmission data S2 corresponding to the transmission payload Si from the transport controller 210, and outputs it to the selector 258.

Further, as the selection signal C10 is inactive, the selector 312 selects the reception data S4 and outputs it to the selector 258.

The selector 258 selects the output S2 of the Tx block 230, and outputs it to the transmitter 282 of the physical layer circuit 280. Accordingly, in this case, the output S3 from the link controller 220 to the serial bus is transmission data generated from the transmission payload Si by the Tx block 230.

The buffer 314 in the data storage circuit 256 does not store the reception data S4 and output to the selector 312.

At the timing T1, by the completion of the data transfer, the transmission start signal C1 is deactivated, and idle data is transmitted/received between the serial data transfer apparatus 200 and the communication destination. As shown in FIG. 6, from the timing T1 to the timing T2, at which the detection circuit 252 detects a CONT primitive from the reception data S4, the primitive detection signal C2 is inactive, and each control signal from the switching circuit 254 does not change.

Therefore, the Tx block 230 continues to operate, generate scramble data, and encode so as to generate idle data, and outputs it to selector 258.

Further, as the selection signal C10 is inactive, the selector 312 selects the reception data S4 and outputs it to the selector 258.

The selector 258 selects the output S2 of the Tx block 230, and outputs it to the transmitter 282 of the physical layer circuit 280. Accordingly, in this period, the output S3 from the link controller 220 to the physical layer circuit 280 is idle data generated by the Tx block 230.

Note that as the storage instruction signal C3 is inactive and the buffer stop signal C1 is active, the buffer 314 in the data supply circuit 256A does not store the reception data S4 and output to the selector 312.

The detection circuit 252 detects a CONT primitive from the reception data S4 at the timing T2, thus the primitive detection signal C2 is activated. Therefore, the transmission data switching circuit 254A activates the storage instruction signal C3 and also deactivates the buffer stop signal C11 at the timing T3, which is immediately after the timing T2. Other control signals do not change.

Then the buffer 314 stores the reception data S4. The stop signal C5 from the transmission data switching circuit 254A to the Tx block 230, the switching signal C6 to the selector 258, and the select signal C10 to the selector 312 remain to be inactive till the timing T4, at which the buffer 314 finishes storing the reception data S4.

Therefore, the Tx block 230 continues to operate, generate scramble data, and encode so as to generate idle data, and outputs it to the selector 258.

The selector 258 selects the output S2 of the Tx block 230, and outputs it to the transmitter 282 of the physical layer circuit 280. Accordingly, in this period, the output S3 from the link controller 220 to the physical layer circuit 280 is idle data generated by the Tx block 230.

At the timing T4, the buffer 314 of the data storage circuit 256A finished storing the reception data S4, thus the buffer 314 activates the storage completion signal C4 and also outputs the stored data to the selector 312.

The transmission data switching circuit 254A activates the switching signal C6 at the same time the storage completion signal C4 is activated. Then, the selector 258 selects the output S5 from the data supply circuit 256A, and outputs it to the transmitter 282 in the physical layer circuit 280. At this time, the select signal C10 is still inactive, thus the output S5 of the selector 312 is the reception data S4.

Thus, in this case, the output S3 from the link controller 220 to the physical layer circuit 280 is the reception data S4 (idle data here).

The transmission data switching circuit 254A activates the stop signal C5 at the timing T5, which is immediately after the timing T4. Then the Tx block 230 stops the operation. Further, the transmission data switching circuit 254A deactivates the storage instruction signal C3 and activates the buffer stop signal C11. Then the buffer 314 stops the operation.

FIG. 7 is a timing chart in case the serial data transfer apparatus returns to the data transfer state in response to a transmission start request from the transport controller 210.

The transport controller 210 activates the transmission start signal C1 to request for a data transfer. When the transmission start signal C1 is activated, the transmission data switching circuit 254A deactivates the stop signal C5 at the timing T12, which is immediately after the timing T11. Then the Tx block 230 starts the operation.

The transmission data switching circuit 254A keeps the switching signal C6 active till the timing T13, at which the transmission data of the Tx block 230 is prepared. Therefore, till the timing T13, the output S3 from the link controller 220 to the physical layer circuit 280 is still idle data which is received from the destination apparatus.

The transmission data switching circuit 254A deactivates the switching signal C6 at the timing T23. Then the link controller 220 outputs the transmission data generated by the Tx block 230. Accordingly, the serial data transfer apparatus enters the data transfer state.

FIG. 8 is a timing chart in case the serial data transfer apparatus shifts to the data transfer state from the idle state in response to a data transfer request from the destination apparatus.

The detection circuit 252 detects a transfer request (XRDY primitive) from the reception data S4 at the timing T21 and deactivates the primitive detection signal C2.

When the primitive detection signal C2 is deactivated, the transmission data switching circuit 254A deactivates the stop signal C5 and the buffer stop signal C11, and activates the select signal C10 at the timing T22, which is immediately after the timing T21.

Then the Tx block 230 starts the operation, and the buffer 314 outputs the buffer data S10 to the selector 312. The selector 312 selects the buffer data S10, and outputs it to the selector 258.

The transmission data switching circuit 254A keeps the switching signal C6 active till the timing T23, at which the Tx block 230 outputs a RRDY primitive to the destination apparatus, indicating "ready to receive". Therefore, till the timing T23, the output S3 from the link controller 220 to the physical layer circuit 280 is idle data.

The transmission data switching circuit 254A deactivates the switching signal C6 at the timing T23. Accordingly the link controller 220 outputs the RRDY primitive, which is output from the Tx block 230 to the selector 258. Then the serial data transfer apparatus enters the data transfer state.

Therefore, also in the serial data transfer apparatus of this exemplary embodiment, idle data defined by the standard can be transmitted to the serial bus during the idle period. Further, the power consumption of the serial data transfer apparatus can be reduced by stopping the operation of the Tx block 230 which includes the data scrambler and the encoder etc.

Moreover, in this exemplary embodiment, while receiving idle data from the destination apparatus, the received idle data is output to the destination apparatus, and the buffer 314 can stop the operation except for the period to fetch the idle data (the timing T3 to T5 in FIG. 6) and the period to output the idle data from the buffer 314 (the timing T12 to T13 in FIG. 7, and the timing T22 to T23 in FIG. 8). This enables to further reduce the power consumption.

[Third Exemplary Embodiment]

A third exemplary embodiment of the present invention is also a serial data transfer apparatus. A serial data transfer apparatus of this exemplary embodiment includes a transmission data switching circuit 254B and a data supply circuit 256B, instead of the transmission data switching circuit 254 and the data storage circuit 256 in the serial data transfer apparatus 200. Only the transmission data switching circuit 254B and the data supply circuit 256B in the serial data transfer apparatus according to the third exemplary embodiment are described in detail.

Figure 9:
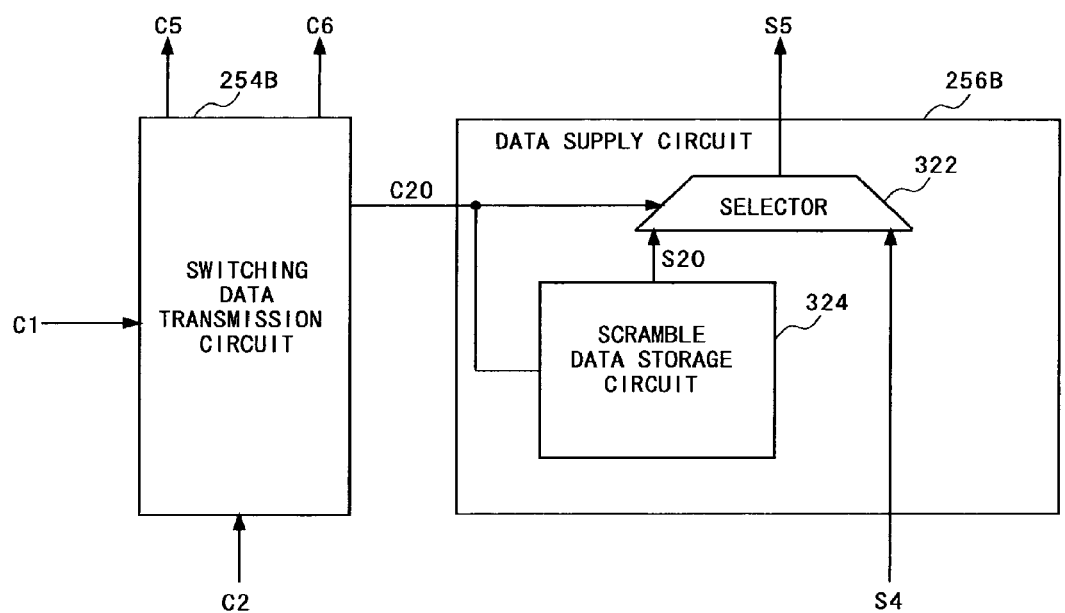
FIG. 9 illustrates a transmission data switching circuit and a data storage circuit according to a third exemplary embodiment of the present invention.

FIG. 9 illustrates the transmission data switching circuit 254B and the data supply circuit 256B in the serial data transfer apparatus of the third exemplary embodiment of the present invention. In FIG. 9, among the data and signals input/output by the transmission data switching circuit 254B and the data storage circuit 256B, similar data and signals as the ones input/output by the transmission data switching circuit 254 and the data storage circuit 256 in the serial data transfer apparatus 200 are denoted by the same signs in FIG. 1.

The data supply circuit 256B includes a selector 322 and a scramble data storage circuit 324 which stores idle data (that is, scramble data) in advance.

The selector 322 selects either the reception data S4 from the destination apparatus or scramble data S20 from the scramble data storage circuit 324, and outputs the selected data to the selector 258. The selector 312 includes a buffer (not illustrated) for aligning the phases of the reception data S4 and the output S3 from the link controller 220 to the physical layer circuit 280, The operation of the selector 322 and the scramble data storage circuit 324 is controlled by a select signal C20 from the transmission data switching circuit 254B.

In this exemplary embodiment, when the transmission start signal C1 from the transport controller 210 is deactivated, the transmission data switching circuit 254B immediately stops the Tx block 230 and the selector 258 selects an output from the selector 322. Further, by activating the select signal C20 until the primitive detection signal C2 is activated, the scramble data storage circuit 324 outputs the scramble data S20 and selector 322 is controlled to select the output from the scramble data storage circuit 324.

Accordingly, in this case, the output S3 from the link controller 220 to the physical layer circuit 280 is scramble data stored beforehand to the scramble data storage circuit 324.

Then, if the primitive detection signal C2 is activated, the scramble data storage circuit 324 is controlled to stop the operation by deactivating the select signal C20 and the selector 322 is controlled to select the reception data S4.

Thus, in this case, the output S3 from the link controller 220 to the physical layer circuit 280 is the reception data S4 (idle data here) from the destination apparatus.

Figure 10:
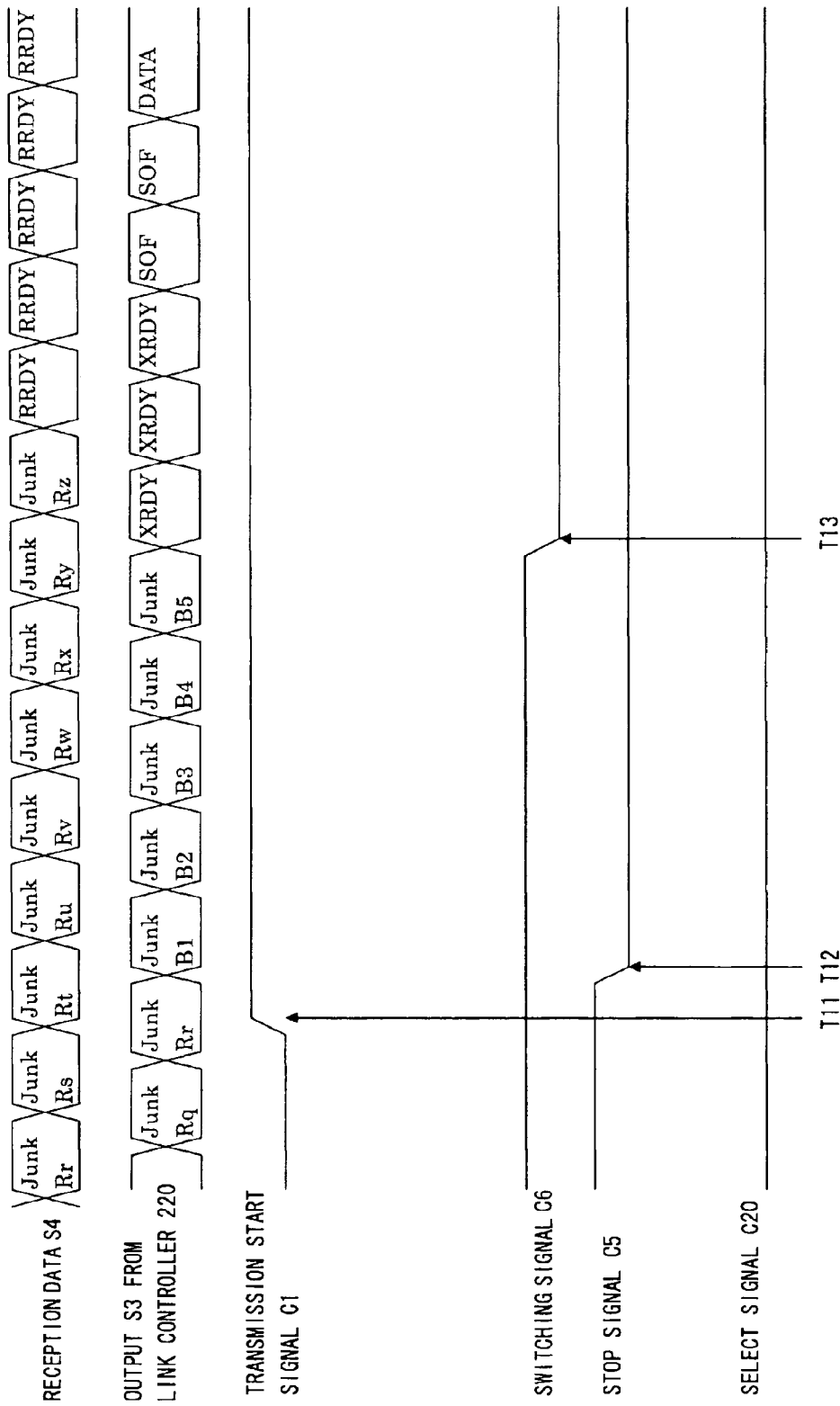
FIG. 10 is a timing chart illustrating the process of the serial data transfer apparatus according to the third exemplary embodiment of the present invention (1)

FIG. 10 is a timing chart in case the serial data transfer apparatus shifts to the data transfer state from the idle state in response to a data transfer request from the transport controller 210.

At the timing T11, the transport controller 210 notifies to the transmission data switching circuit 254B that the data transmission has started. Thus the transport controller 210 activates the transmission start signal C1 to request for a data transfer.

When the transmission start signal C1 is activated, the transmission data switching circuit 254B deactivates the stop signal C5 at the timing T12, which is immediately after the timing T11.

The transmission data switching circuit 254B keeps the switching signal C6 active and the select signal C20 inactive till the timing T13, at which the transmission data of the Tx block 230 is prepared. Accordingly, till the timing T13, the output S3 from the link controller 220 to the physical layer circuit 280 is the reception data S4 (idle data here) from the destination apparatus.

The transmission data switching circuit 254B deactivates the switching signal C6 at the timing T13. Then the selector 258 selects the output S2 of the Tx block 230, and the link controller 220 outputs the transmit data generated by the Tx block 230.

Note that the transmission data switching circuit 254B maintains the select signal C20 to be inactive even after the timing T13.

Figure 11:
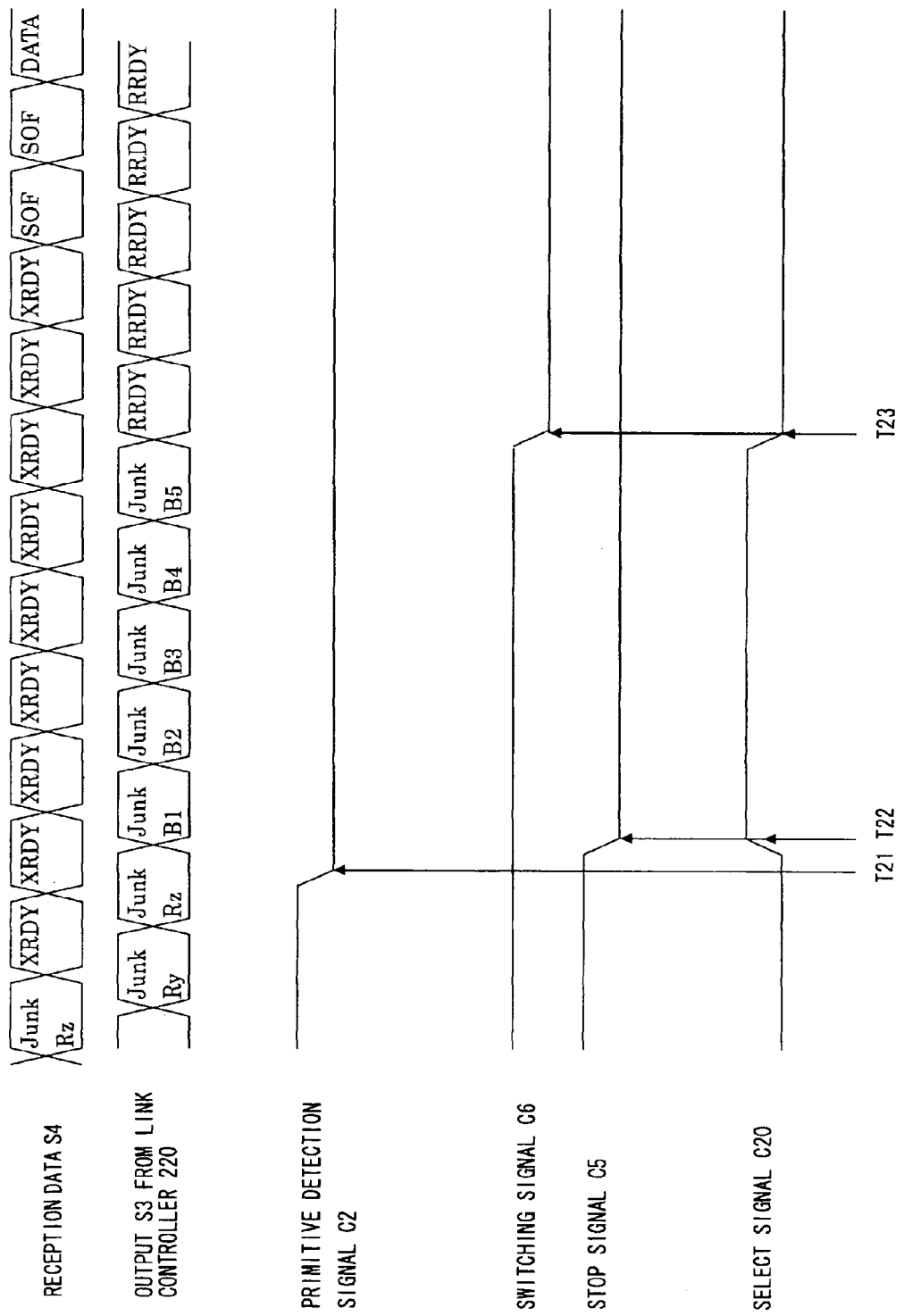
FIG. 11 is a timing chart illustrating the process of the serial data transfer apparatus according to the third exemplary embodiment of the present invention (2)

FIG. 11 is a timing chart in case the serial data transfer apparatus shifts to the data transfer state from the idle state in response to a data transfer request from the destination apparatus.

The detection circuit 252 detects a transfer request (XRDY primitive) from the reception data S4 at the timing T21 and deactivates the primitive detection signal C2.

When the primitive detection signal C2 is deactivated, the transmission data switching circuit 254B deactivates the stop signal C5 and activates the select signal C20 at the timing T22, which is immediately after the timing T21.

Then the Tx block 230 starts the operation, the scramble data storage circuit 324 outputs the scramble data S20 to the selector 322, and the selector 322 outputs the scramble data S20 to the selector 258.

The transmission data switching circuit 254B keeps the switching signal C6 active till the timing T23, at which the Tx block 230 outputs a RRDY primitive to the destination apparatus, indicating "ready to receive." Therefore, till the timing T23, the output S3 from the link controller 220 to the physical layer circuit 280 is scramble data S20 from the scramble data storage circuit 324.

The transmission data switching circuit 254B deactivates the switching signal C6 and the select signal C20 at the timing T23. Then the link controller 220 outputs the RRDY primitive output from the Tx block 230 to the selector 258.

Therefore, also in the serial data transfer apparatus of this exemplary embodiment, idle data defined by the standard can be transmitted to the serial bus during the idle period. Further, the power consumption of the serial data transfer apparatus can be reduced by stopping the operation of the Tx block 230 which includes the data scrambler and the encoder etc.

Moreover, in this exemplary embodiment, the scramble data storage circuit 324 stores the scramble data beforehand. Thus the operation of the Tx block 230 can be stopped immediately after the transmission start signal C1 is deactivated, thereby further reducing the power consumption of the serial data transfer apparatus.

Additionally, while receiving idle data from the destination apparatus, the received idle data is output to the destination apparatus. This enables to operate the buffer 324 only in the period from when the transmission start signal C1 is deactivated until the primitive detection signal C2 is activated, and the period to shift to the data transfer state in response to a transfer request from the destination apparatus (the timing T22 to T23 in FIG. 8), and the buffer 324 stops the operation in the other periods. This further reduces the power consumption of the serial data transfer apparatus.

[Fourth Exemplary Embodiment]

Figure 12:
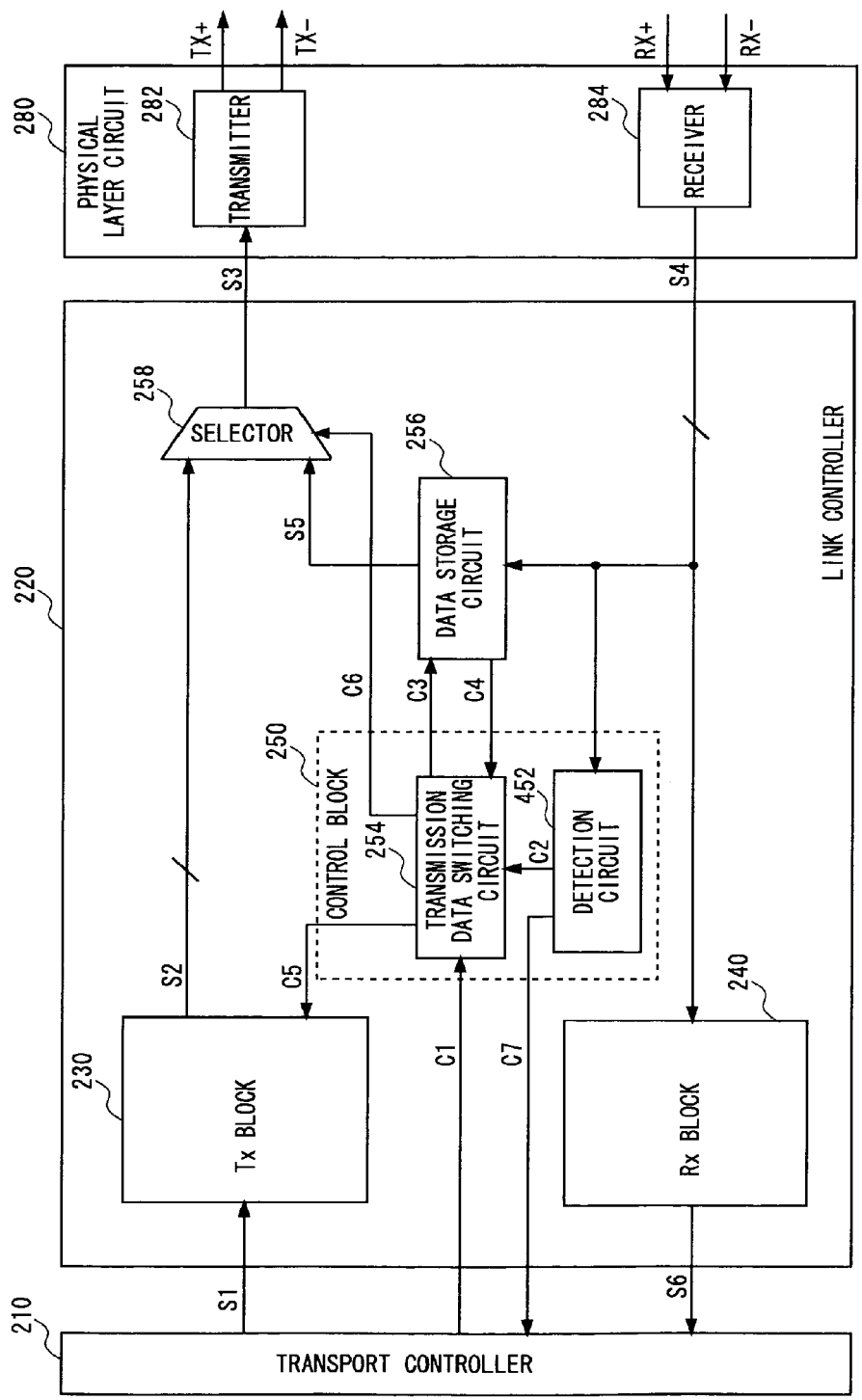
FIG. 12 illustrates a serial transfer apparatus according to a fourth embodiment of the present invention.

FIG. 12 illustrates a serial data transfer apparatus 400 according to a fourth exemplary embodiment of the present invention. The serial data transfer apparatus 400 also conforms to the SATA standard, including a detection circuit 452 instead of the detection circuit 252 of the serial data transfer apparatus 200. The detection circuit 452 and a difference between the serial data transfer apparatus 200 and the serial data transfer apparatus 400 due to the change to the detection circuit 452 are described here. In FIG. 12, among the data and signals input/output to the detection circuit 452, similar data and signals as the ones input/output to the detection circuit 252 in the serial data transfer apparatus 200 are denoted by the same signs in FIG. 1.

The detection circuit 452 performs all the processes performed by the detection circuit 252. Further, the detection circuit 452 detects a communication data error from the reception data S4 (invalid primitive other than CONT primitive, a 10b/8b code error, a bit slip error etc.) and when detecting a communication data error, the detection circuit 452 outputs an error notification signal C7 to the transport controller 210.

If the transport controller 210 in the serial data transfer apparatus 400 receives the error notification signal C7, the transport controller 210 activates the transmission start signal C1 in order to notify the transmission data switching circuit 254 that the data transmission has started to request for a data transfer.

Further, as with the detection circuit 252, when the detection circuit 452 detects a CONT primitive, the detection circuit 452 activates the primitive detection signal C2 to be output to the transmission data switching circuit 254. When the detection circuit 452 detects an effective primitive, the primitive detection signal is deactivated. Moreover, when detecting a communication data error, the detection circuit 452 deactivates the primitive detection signal C2.

Figure 13:
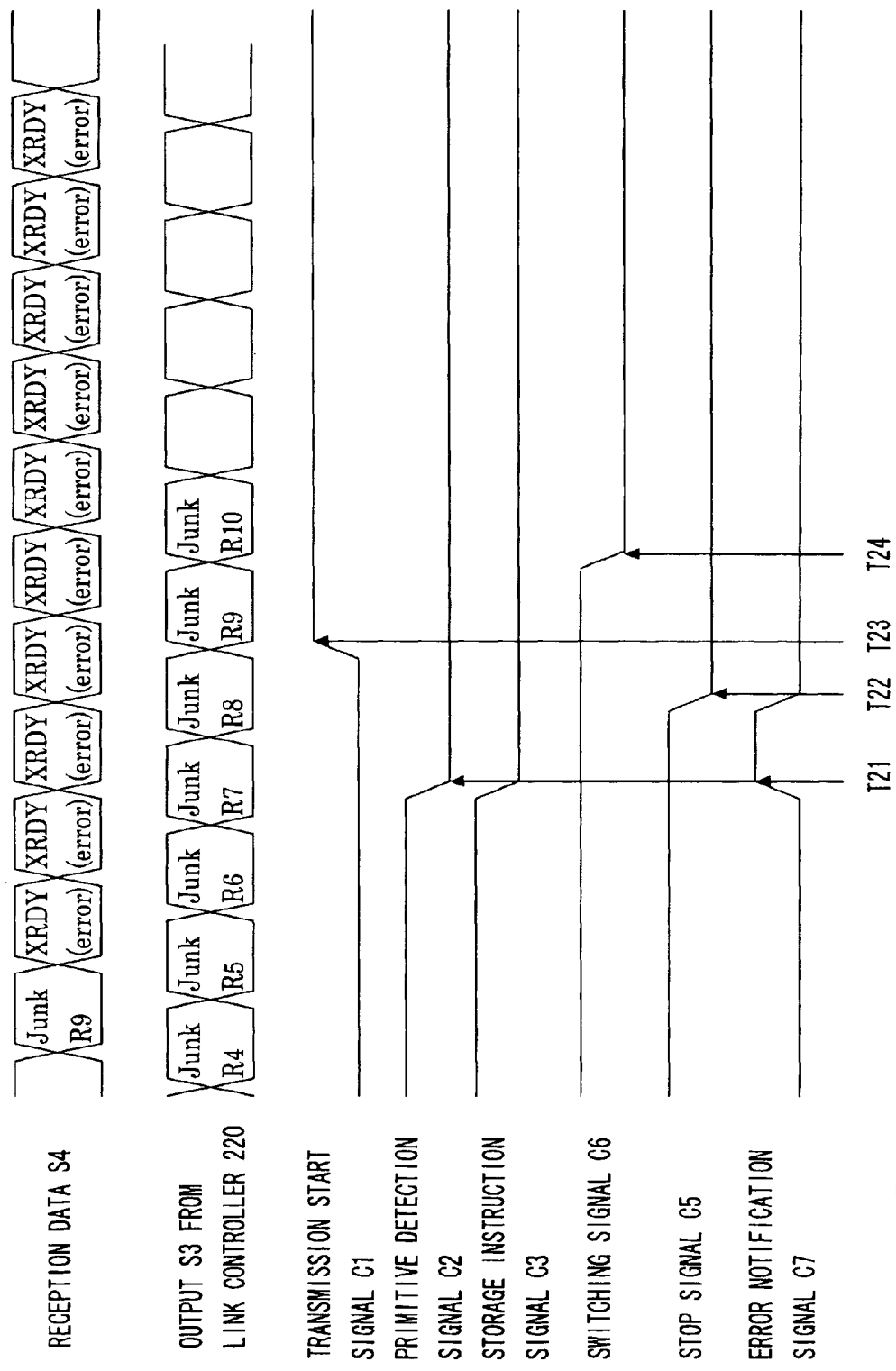
FIG. 13 is a timing chart illustrating the process when the serial data transfer apparatus of FIG. 12 receives a communication data error in an idle period.

FIG. 13 is a timing chart in case the serial data transfer apparatus 400 shifts to the data transfer state from the idle state in response to a data transfer request including an error from the destination apparatus.

As the detection circuit 452 detects a communication data error (XRDY primitive error) from the reception data S4 at the timing T21, the error notification signal C7 is activated in order to notify an error to the transport controller 210 and the primitive detection signal C2 is deactivated.

When the primitive detection signal C2 is deactivated, the transmission data switching circuit 254 deactivates the storage instruction signal C3 and also deactivates the stop signal C5 at the timing T22, which is immediately after the timing T21.

Therefore, the data storage circuit 256 stops to store the reception data S4, and the Tx block 230 starts the operation. The transmission data switching circuit 254 keeps the switching signal C6 active till the timing T24 at which the Tx block 230 can output data to the communication destination. Therefore, till the timing T24, the output S3 from the link controller 220 to the physical layer circuit 280 is idle data which is stored to the data storage circuit 256 and received from the destination apparatus.

The error notification signal C7 notifies an error to the transport controller 210 at the timing T23. Thus the transport controller 210 activates the transmission start signal C1 in order to notify the transmission data switching circuit 254 that the data transmission has started to request for a data transfer, and returns to the data transfer state.

The transmission data switching circuit 254 deactivates the switching signal C6 at the timing T24. Then the selector 258 selects the transmission data S2 of the Tx block 230 and the data is output from the link controller 220. Thus the serial data transfer enters the data transfer state.

Transfer requests from the destination apparatus may be received as errors due to various causes. On the other hand, the serial data transfer apparatus 400 of this exemplary embodiment returns to the transfer state even when the data received from the destination apparatus in an idle period is not a transfer request but a communication data error. This enables to achieve all the effects obtained by serial data transfer apparatus 200 and also enables to return to the transfer state even if a transfer request from the destination apparatus is erroneous.

While the invention has been described in terms of several exemplary embodiments, those skilled in the art will recognize that the invention can be practiced with various modifications within the spirit and scope of the appended claims and the invention is not limited to the examples described above.

In the above exemplary embodiments, the transmission data switching circuit activates the stop signal to stop the Tx block. However the Tx block may be stopped by disconnecting a power supply to the Tx block, for example.

Further, the scope of the claims is not limited by the exemplary embodiments described above.

Furthermore, it is noted that, Applicant's intent is to encompass equivalents of all claim elements, even if amended later during prosecution.

Furthermore, the above exemplary embodiments can be combined as desirable by one of ordinary skill in the art.

What is claimed is:

1. A serial data transfer apparatus comprising:
    a receiver coupled to a serial bus on which an idle data is transmitted from a destination apparatus which communicates with the serial data transfer apparatus toward the serial data transfer apparatus;
    a data storage unit coupled to the receiver to store the idle data received therefrom; and
    a transmitter coupled to the data storage unit and a serial bus to output the idle data read from the data storage unit onto the serial bus toward the destination apparatus,
    wherein the idle data toward the serial data transfer apparatus and the idle data read therefrom toward the destination apparatus are transmitted on the serial bus partially in parallel.

2. The serial data transfer apparatus according to claim 1, wherein the data storage unit stores another idle data transmitted after the idle data.

3. The serial data transfer apparatus according to claim 2, wherein the transmitter outputs the another idle data read from the data storage unit onto the serial bus.

4. The serial data transfer apparatus according to claim 1, further comprising:
    a selector coupled to the data storage unit, a transmission process block, and the transmitter.

5. The serial data transfer apparatus according to claim 4, further comprising a control block coupled to the transmission process block, the data storage unit, and the selector to stop an operation of the transmission process block.

6. The serial data transfer apparatus according to claim 1, wherein a primitive is transmitted from the destination apparatus.

7. The serial data transfer apparatus according to claim 1, further comprising:
   a selector coupled to the data storage unit and the receiver to output selected one of the idle data received and stored in the data storage unit and the idle data received from the receiver and not stored therein to the transmitter.

8. A serial data transfer apparatus comprising:
   a receiver coupled to a serial bus on which an idle data is transmitted from a destination apparatus which communicates with the serial data transfer apparatus toward the serial data transfer apparatus;
   a transmitter coupled to a serial bus to output one of the idle data received through a first pass from the receiver to the transmitter and the idle data received through a second pass from a transmission process block to the transmitter, wherein the number of bits of the idle data in the first pass is not changed,
   wherein the idle data toward the serial data transfer apparatus and the idle data toward the destination apparatus are transmitted on the serial data bus partially in parallel.

9. A serial data transfer apparatus comprising:
   a receiver coupled to a serial bus on which an idle data is transmitted from a destination apparatus which communicates with the serial data transfer apparatus toward the serial data transfer apparatus; and
   a transmitter coupled to a serial bus to output the idle data received therefrom onto the serial bus toward the destination apparatus,
   wherein the idle data toward the serial data transfer apparatus and the idle data toward the destination apparatus are transmitted on the serial bus partially in parallel.

\* \* \* \* \*